United States Patent
Okabe

(10) Patent No.: US 11,508,982 B2
(45) Date of Patent: Nov. 22, 2022

(54) FUEL CELL STACK

(71) Applicant: TOYOTA JIDOSHA KABUSHIKI KAISHA, Toyota (JP)

(72) Inventor: Hiroki Okabe, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 34 days.

(21) Appl. No.: 17/245,177

(22) Filed: Apr. 30, 2021

(65) Prior Publication Data
US 2021/0359333 A1 Nov. 18, 2021

(30) Foreign Application Priority Data
May 15, 2020 (JP) .............................. JP2020-086098

(51) Int. Cl.
*H01M 8/2483* (2016.01)
*H01M 8/1004* (2016.01)

(52) U.S. Cl.
CPC ....... *H01M 8/2483* (2016.02); *H01M 8/1004* (2013.01); *H01M 2250/20* (2013.01)

(58) Field of Classification Search
CPC ............. H01M 8/2483; H01M 8/1004; H01M 2250/20; H01M 8/0276; H01M 8/04253; H01M 8/04291
See application file for complete search history.

(56) References Cited

U.S. PATENT DOCUMENTS

| | | | | |
|---|---|---|---|---|
| 2009/0239129 A1* | 9/2009 | Seido | .................. | H01M 8/2457 429/437 |
| 2010/0209798 A1 | 8/2010 | Nunokawa et al. | | |
| 2012/0270136 A1* | 10/2012 | Mizusaki | ............ | H01M 8/0273 429/482 |
| 2013/0004877 A1* | 1/2013 | Takeguchi | .......... | H01M 8/0263 429/437 |
| 2019/0379066 A1* | 12/2019 | Nonoyama | ......... | H01M 8/0273 |

FOREIGN PATENT DOCUMENTS

| | | |
|---|---|---|
| JP | 2006-004799 A | 1/2006 |
| JP | 2010-192291 A | 9/2010 |
| JP | 2019-102146 A | 6/2019 |

* cited by examiner

*Primary Examiner* — Stewart A Fraser
(74) *Attorney, Agent, or Firm* — Finnegan, Henderson, Farabow, Garrett & Dunner, LLP

(57) ABSTRACT

A fuel cell stack comprising stacked unit cells, each comprising a membrane electrode assembly comprising an electrolyte membrane and a pair of electrodes disposed on both surfaces thereof, two separators sandwiching the membrane electrode assembly, and a frame-shaped resin sheet disposed between the two separators and around the membrane electrode assembly to attach the separators, wherein the resin sheet comprises a first protrusion protruding in the planar direction of the resin sheet and occupying a part of a first region occupied by a reaction gas inlet manifold, and a second protrusion protruding in the planar direction of the resin sheet and occupying a part of a second region occupied by a reaction gas outlet manifold; and wherein the resin sheet comprises at least one water discharge hole at a predetermined position of at least one protrusion selected from the group consisting of the first protrusion and the second protrusion.

2 Claims, 3 Drawing Sheets

FUEL CELL STACK

TECHNICAL FIELD

The disclosure relates to a fuel cell stack.

BACKGROUND

A fuel cell (FC) is a power generation device that generates electrical energy by electrochemical reaction between hydrogen ($H_2$), which serves as fuel gas, and oxygen ($O_2$), which serves as oxidant gas, in a fuel cell stack (hereinafter, it may be simply referred to as "stack") composed of stacked unit fuel cells (hereinafter, it may be referred to as "cells"). Hereinafter, fuel gas and oxidant gas may be collectively and simply referred to as "reaction gas" or "gas".

In general, the unit fuel cells are composed of a membrane electrode assembly (MEA) and, as needed, two separators sandwiching the membrane electrode assembly.

The membrane electrode assembly has such a structure, that a catalyst layer and a gas diffusion layer are formed in this order on both surfaces of a solid polymer type electrolyte membrane having proton ($H^+$) conductivity (hereinafter, it may be simply referred to as "electrolyte membrane").

In general, the separators have such a structure that a groove is formed as a reaction gas flow path on a surface in contact with the gas diffusion layer. The separators function as a collector of generated electricity.

In the fuel electrode (anode) of the fuel cell, the hydrogen supplied from the gas flow path and the gas diffusion layer is protonated by the catalytic activity of the catalyst layer, and the protonated hydrogen goes to the oxidant electrode (cathode) through the electrolyte membrane. An electron is generated at the same time, and it passes through an external circuit, do work, and then goes to the cathode. The oxygen supplied to the cathode reacts with the proton and electron on the cathode, thereby generating water.

The generated water provides the electrolyte membrane with appropriate moisture. Redundant water penetrates the gas diffusion layer and then is discharged to the outside of the system.

There has been considerable research on a fuel cell stack installed and used in a fuel cell vehicle (hereinafter, it may be simply referred to as "vehicle").

A fuel cell stack generally employs a reaction gas communication hole penetrating in the stacking direction of unit cells, that is, a so-called manifold. When water is generated by power generation reaction and accumulated especially in the reaction gas outlet manifold (outlet-side reaction gas communication hole) of such a manifold-type fuel cell stack, there are the following possibilities, for example: the generated water flows back to the unit cells during gas purging, and it takes a long time to warm the fuel cell stack since the generated water freezes at freezing temperatures. Accordingly, it is needed to reduce the accumulated water.

For example, Patent Literature 1 discloses a fuel cell stack which is enable to surely let condensed water directly fall in the direction of gravity along a reaction gas communicating hole, and which is enable to quickly stop the generation of liquid junction between power generating cells.

Patent Literature 2 discloses a fuel battery unit cell which is capable of reducing complexity of work.

Patent Literature 3 discloses a gasket for fuel cells, which is capable of suppressing the accumulation of moisture generated on a cathode surface side in a cell in a gasket fitting groove, and which is capable of suppressing a decrease in power generation efficiency caused by the accumulation of the moisture.

Patent Literature 1: Japanese Patent Application Laid-Open (JP-A) No. 2010-192291
Patent Literature 2: JP-A No. 2019-102146
Patent Literature 3: JP-A No. 2006-004799

According to the technique disclosed in Patent Literature 1, even if the accumulated water can fall by gravity and by air flow generated by gas purging, the accumulated water may remain due to surface tension. Also, there is a possibility that the accumulated water cannot fully fall when the stacking direction of the stack disagrees with the direction of gravity.

The resin sheet described in Patent Literature 2 has an extension extending to a manifold side; however, it does not have a water discharge hole. In the fuel battery unit cell of Patent Literature 2, accordingly, liquid water is likely to be accumulated around the manifold.

If liquid water remains in the manifold, there are the following problems: the purging time is prolonged due to a reduction in the air flow amount during the gas purging, and the fuel cell stack warming time is prolonged due to the freezing of the accumulated water at freezing temperatures.

SUMMARY

The disclosed embodiments were achieved in light of the above circumstances. An object of the disclosed embodiments is to provide a fuel cell stack configured to reduce the amount of liquid water remaining in its manifolds, to reduce the prolongation of the purging time which is due to a reduction in the air flow amount during the gas purging, and to reduce the prolongation of the fuel cell stack warming time which is due to the freezing of the accumulated water at freezing temperatures.

In a first embodiment, there is provided a fuel cell stack comprising stacked unit cells, each comprising a membrane electrode assembly comprising an electrolyte membrane and a pair of electrodes disposed on both surfaces thereof, two separators sandwiching the membrane electrode assembly, and a frame-shaped resin sheet disposed between the two separators and around the membrane electrode assembly to attach the separators, wherein the separators comprise a reaction gas flow path for flowing reaction gas in a planar direction of the separators, a reaction gas supply hole for distributing the reaction gas in a stacking direction of the unit cells, and a reaction gas discharge hole for distributing the reaction gas in the stacking direction of the unit cells;

wherein the resin sheet comprises a reaction gas supply hole and a reaction gas discharge hole, which are aligned and disposed to communicate with the reaction gas supply hole and reaction gas discharge hole of the separators, respectively;

wherein the fuel cell stack comprises a reaction gas inlet manifold communicating between the reaction gas supply holes and a reaction gas outlet manifold communicating between the reaction gas discharge holes;

wherein the fuel cell stack comprises a gasket between the separators of the adjacent unit cells, at a periphery of the reaction gas inlet manifold, and at a periphery of the reaction gas outlet manifold;

wherein the resin sheet comprises a first protrusion protruding in a planar direction of the resin sheet and occupying a part of a first region occupied by the reaction gas inlet manifold, and a second protrusion protruding in the planar direction of the resin sheet and occupying a part of a second region occupied by the reaction gas outlet manifold; and wherein the resin sheet comprises at least one water discharge hole at a predetermined position of at least one protrusion selected from the group consisting of the first protrusion and the second protrusion.

The gasket comprises a fixed size part for stacking the unit cells in parallel, and the gasket may comprise an extension extending the fixed size part to align with the protrusions of the resin sheet.

According to the disclosed embodiments, the fuel cell stack configured to reduce the amount of liquid water remaining in the manifolds, is provided.

BRIEF DESCRIPTION OF THE DRAWINGS

In the accompanying drawings.

DETAILED DESCRIPTION

Figure 1:
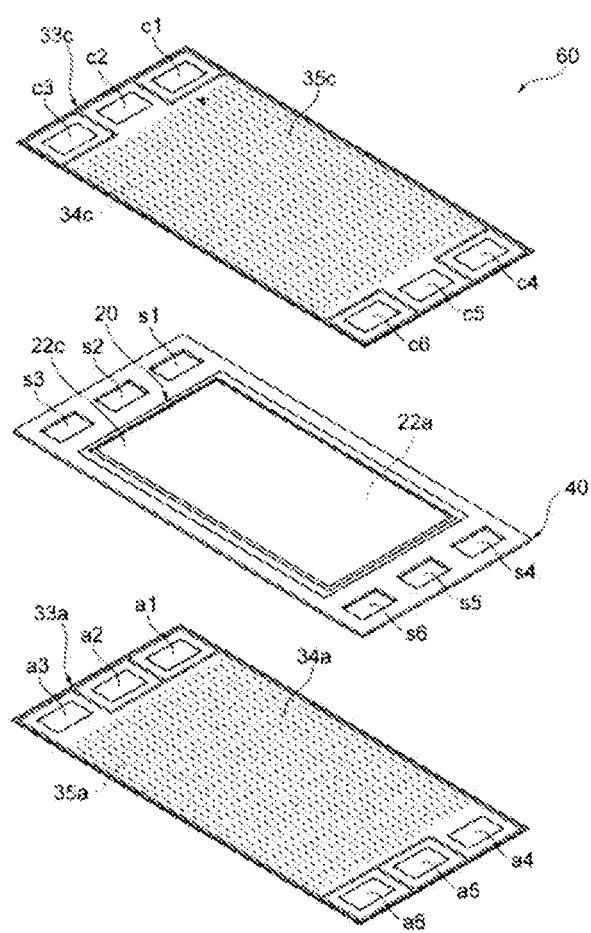
FIG. 1 is an exploded perspective view of the unit cell of a fuel cell.

The fuel cell stack of the disclosed embodiments is a fuel cell stack comprising stacked unit cells, each comprising a membrane electrode assembly comprising an electrolyte membrane and a pair of electrodes disposed on both surfaces thereof, two separators sandwiching the membrane electrode assembly, and a frame-shaped resin sheet disposed between the two separators and around the membrane electrode assembly to attach the separators, wherein the separators comprise a reaction gas flow path for flowing reaction gas in a planar direction of the separators, a reaction gas supply hole for distributing the reaction gas in a stacking direction of the unit cells, and a reaction gas discharge hole for distributing the reaction gas in the stacking direction of the unit cells;

wherein the resin sheet comprises a reaction gas supply hole and a reaction gas discharge hole, which are aligned and disposed to communicate with the reaction gas supply hole and reaction gas discharge hole of the separators, respectively;

wherein the fuel cell stack comprises a reaction gas inlet manifold communicating between the reaction gas supply holes and a reaction gas outlet manifold communicating between the reaction gas discharge holes;

wherein the fuel cell stack comprises a gasket between the separators of the adjacent unit cells, at a periphery of the reaction gas inlet manifold, and at a periphery of the reaction gas outlet manifold;

wherein the resin sheet comprises a first protrusion protruding in a planar direction of the resin sheet and occupying a part of a first region occupied by the reaction gas inlet manifold, and a second protrusion protruding in the planar direction of the resin sheet and occupying a part of a second region occupied by the reaction gas outlet manifold; and wherein the resin sheet comprises at least one water discharge hole at a predetermined position of at least one protrusion selected from the group consisting of the first protrusion and the second protrusion.

When a vehicle is stopped in freezing environments, the gas purging is needed to discharge liquid water. By capillary force, the liquid water may be accumulated in the space around the gasket disposed between the unit cells. After the gas purging is completed, the liquid water accumulated in the space around the gasket may be pushed from the space around the gasket into the manifolds and may cause liquid leakage into the manifolds.

If the leaked liquid water moves to the gas flow paths of the separators, a gas discharge valve, a water discharge valve, etc., and if it is frozen during the vehicle is stopped, there is a problem in that it is difficult to start the vehicle at freezing temperatures.

This problem can be prevented by decreasing the flow amount of purge gas and equalizing the pressure of the inside of the manifolds to the pressure of the space around the gasket. However, there is another problem in that it is needed to prolong the purging time.

In particular, the causes for the liquid water leakage in the manifolds are estimated as follows.

(1) During power generation by the stack, part of the liquid water is moved by capillary force to the space around the gasket between the unit cells (the periphery of the manifolds), and the liquid water is gradually accumulated in the space around the gasket.

(2) Before the gas purging, the pressure $P1$ of the inside of the manifolds is equal to the pressure $P2$ of the space around the gasket (the space which is not filled with the liquid water) ($P1=P2$).

(3) In the first half of the gas purging, the pressure of the inside of the manifolds is increased from $P1$ to $P1^+$ by the gas purging, and the pressure $P1^+$ of the inside of the manifolds is increased to more than the pressure $P2$ of the side of the gasket ($P1^+>P2$).

(4) in the second half of the gas purging, the gas is compressed to increase the pressure $P2$ of the space around the gasket to $P2^+$, and the pressure $P1^+$ of the inside of the manifolds is equalized to the pressure $P2^+$ of the space around the gasket ($P1^+=P2^+$).

(5) After the gas purging is completed, due to the completion of the gas purging, the pressure of the inside of the manifolds is decreased from $P1^+$ to $P1^-$, and the pressure $P1^-$ of the inside of the manifolds is decreased to less than the pressure $P2^+$ of the space around the gasket ($P1^-<P2^+$). Accordingly, the gas in the space around the gasket is expanded to push the liquid water in the space around the gasket, thereby causing the liquid leakage.

It was found that the amount of liquid water remaining in the manifolds can be reduced by disposing the water discharge hole in the protrusions of the resin sheet.

The fuel cell stack of the disclosed embodiments is composed of stacked unit fuel cells.

The number of the stacked unit fuel cells is not particularly limited. For example, two to several hundred unit fuel cells may be stacked, or 2 to 200 unit fuel cells may be stacked.

The fuel cell stack may include an end plate at both stacking-direction ends of each unit fuel cell.

Each unit fuel cell comprises the following: the membrane electrode assembly comprising the electrolyte membrane and the pair of electrodes disposed on both surfaces thereof, the two separators sandwiching the membrane electrode assembly, and the frame-shaped resin sheet disposed between the two separators and around the membrane electrode assembly to attach the separators.

The pair of electrodes are an oxidant electrode and a fuel electrode.

The oxidant electrode includes an oxidant electrode catalyst layer and a gas diffusion layer.

The fuel electrode includes a fuel electrode catalyst layer and a gas diffusion layer.

The oxidant electrode catalyst layer and the fuel electrode catalyst layer may contain a catalyst metal for accelerating an electrochemical reaction, a proton-conducting electrolyte, or electron-conducting carbon particles, for example.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution may be used.

The catalyst metal is supported on carbon particles. In each catalyst layer, the carbon particles supporting the catalyst metal (i.e., catalyst particles) and the electrolyte may be mixed.

As the carbon particles for supporting the catalyst metal (i.e., supporting carbon particles), for example, water repellent carbon particles obtained by enhancing the water repellency of commercially-available carbon particles (carbon powder) by heating, may be used.

The gas diffusion layer may be a gas-permeable, electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a moisture-containing, thin perfluorosulfonic acid membrane. The electrolyte membrane may be a Nafion membrane (manufactured by Dupont), for example.

The separators comprise the reaction gas flow path for flowing the reaction gas in the planar direction of the separators, the reaction gas supply hole for distributing the reaction gas in the stacking direction of the unit cells, and the reaction gas discharge hole for distributing the reaction gas in the stacking direction of the unit cells.

As the reaction gas supply hole, examples include, but are not limited to, a fuel gas supply hole and an oxidant gas supply hole.

As the reaction gas discharge hole, example include, but are not limited to, a fuel gas discharge hole and an oxidant gas discharge hole.

The separators may have a refrigerant supply hole and a refrigerant discharge hole, which are holes for distributing a refrigerant in the stacking direction of the unit cells.

The separators may have a reaction gas flow path on a surface in contact with the gas diffusion layer. Also, on an opposite surface to the surface in contact with the gas diffusion layer, the separators may have a refrigerant flow path for keeping the stack temperature at a constant level.

The separators may be a gas-impermeable, electroconductive member, etc. As the electroconductive member, examples include, but are not limited to, gas-impermeable dense carbon obtained by carbon densification, and a metal plate obtained by press molding. The separators may have a current collection function.

The fuel cell stack comprises the reaction gas inlet manifold communicating between the reaction gas supply holes and the reaction gas outlet manifold communicating between the reaction gas discharge holes.

As the reaction gas inlet manifold, examples include, but are not limited to, an anode inlet manifold and a cathode inlet manifold.

As the reaction gas outlet manifold, examples include, but are not limited to, an anode outlet manifold and a cathode outlet manifold.

The fuel cell stack may comprise a refrigerant inlet manifold communicating between the refrigerant supply holes and a refrigerant outlet manifold communicating between the refrigerant discharge holes.

The resin sheet is a frame-shaped resin component disposed between the two separators (the anode-side separator and the cathode-side separator) of the unit cells and around the membrane electrode assembly.

Also, the resin sheet is a resin component for preventing a cross leak or an electrical short circuit between the catalyst layers of the membrane electrode assembly.

The resin sheet may include a frame-shaped resin core layer and two frame-shaped adhesive layers disposed on both surfaces of the core layer, that is, the first adhesive layer and the second adhesive layer.

As with the core layer, the first adhesive layer and the second adhesive layer are disposed in a frame-shaped manner on both surfaces of the core layer.

The resin sheet extends in parallel with the membrane electrode assembly, at an offset position from the plane of the membrane electrode assembly. An adhesive may be disposed between the inner periphery of the frame-shaped resin sheet and the peripheral region of the membrane electrode assembly to attach them.

The adhesive may be thermosetting resin or ultraviolet curable resin, for example. The state of the adhesive before application may be gel or crème, for example.

The core layer may be formed from such a material, that the structure is not changed at the temperatures of hot pressing in the process of producing the unit cells. As the material for the core layer, examples include, but are not limited to, polyethylene naphthalate (PEN), polyethersulfone (PES) and polyethylene terephthalate (PET).

To attach the core layer, the anode-side separator and the cathode-side separator and ensure sealing properties, the first and second adhesive layers may have the following properties: high adhesion to other substances, capability of softening at the hot pressing temperatures, and lower viscosity and melting point than the core layer. In particular, the first and second adhesive layers may be thermoplastic resin such as polyester resin and modified olefin resin, or it may be thermosetting resin (modified epoxy resin).

The first adhesive layer and second adhesive layer of the resin sheet may be disposed only in a part which is attached to the anode-side separator and a part which is attached to the cathode-side separator, respectively. The first adhesive layer disposed on one surface of the core layer may be attached to the cathode-side separator. The second adhesive layer disposed on the other surface of the core layer may be attached to the anode-side separator. Then, the resin sheet is sandwiched between the pair of separators.

The resin sheet comprises the reaction gas supply hole and the reaction gas discharge hole, which are aligned and disposed to communicate with the reaction gas supply hole and reaction gas discharge hole of the separators, respectively.

The resin sheet comprises the first protrusion protruding in the planar direction of the resin sheet and occupying a part of the first region occupied by the reaction gas inlet manifold, and the second protrusion protruding in the planar direction of the resin sheet and occupying a part of the second region occupied by the reaction gas outlet manifold.

The shape of the protrusions of the resin sheet is not particularly limited. To avoid a short circuit caused by a contact between the separators, the resin sheet is generally extended in the planar direction a little longer than the separators, thereby preventing a short circuit caused by a contact between the separators in the case where the separators have different lengths. Accordingly, the protrusions of the resin sheet may be concentrically extended toward the center of the manifolds, or they may be extended so that the area of the manifolds decreases.

The resin sheet may comprise at least one water discharge hole at a predetermined position of at least one protrusion selected from the group consisting of the first protrusion and the second protrusion. Since the amount of the generated water is mainly larger in the reaction gas outlet manifold than in the reaction gas inlet manifold, the water discharge hole may be disposed at the predetermined position of the second protrusion, which is the protrusion on the reaction gas outlet manifold side, or the water discharge hole may be disposed at the predetermined position of both the first protrusion and the second protrusion.

The number of the water discharge hole is not particularly limited. The resin sheet may have one or more water discharge holes, or it may have water discharge holes at predetermined intervals.

The position of the water discharge hole is not particularly limited. For example, when the refrigerant flow path and the reaction gas flow path are disposed on the membrane electrode assembly side of the resin sheet by the separators, the water discharge hole may be disposed on the outer peripheral side of the unit cells, or it may be disposed on the membrane electrode assembly side, too. On the other hand, when the refrigerant flow path and reaction gas flow path are not disposed on the membrane electrode assembly side of the resin sheet, the generated water generally flows from the membrane electrode assembly side. Accordingly, the water discharge hole may be disposed on the membrane electrode assembly side.

The fuel cell stack comprises the gasket between the separators of the adjacent unit cells, at the periphery of the reaction gas inlet manifold, and at the periphery of the reaction gas outlet manifold.

The gasket may comprise a fixed size part for stacking the unit cells in parallel.

The gasket may comprise an extension extending the fixed size part to align with the protrusions of the resin sheet.

The extension may have a water discharge hole which is aligned with the water discharge hole disposed at the predetermined position of the protrusion of the resin sheet.

The number of the water discharge hole of the extension may be the same as or different from the number of the water discharge hole of the protrusion. From the viewpoint of reducing the amount of the liquid water remaining in the manifolds, they may be the same.

The basic structure of the unit cells in the fuel cell of the disclosed embodiments, will be described with reference to FIG. 1.

FIG. 1 is an exploded perspective view of a unit cell 60. The fuel cell stack is composed of stacked unit cells 60. The fuel cell stack is a solid polymer type fuel cell which generates power by the supply of fuel gas (such as hydrogen) and oxidant gas (such as oxygen) as the reaction gas.

The unit cell 60 includes an anode-side separator 33a, a cathode-side separator 33c and a membrane electrode assembly 20 sandwiched between the separators.

The membrane electrode assembly 20 is referred to as "membrane electrode gas diffusion layer assembly" (or MEGA) since it has an anode-side gas diffusion layer 22a and a cathode-side gas diffusion layer 22c on the anode side and cathode side of the assembly, respectively.

A resin sheet 40 (an adhesive laminate for sealing) is disposed in the peripheral region of the membrane electrode assembly 20, which is a frame-shaped, electrically insulating resin sheet having a sealing function.

Holes a1 to a3 are formed on one of the two shorter sides of the anode-side separator 33a, and holes a4 to a6 are formed on the other shorter side of the anode-side separator 33a. Similarly, holes c1 to c3 are formed on one of the two shorter sides of the cathode-side separator 33c, and holes c4 to c6 are formed on the other shorter side of the cathode-side separator 33c.

Holes s1 to s3 are formed on one of the two shorter sides of the resin sheet 40, and holes s4 to s6 are formed on the other shorter side of the resin sheet 40. The holes a1, s1 and c1 communicate to define the cathode inlet manifold. Similarly, the holes a2, s2 and c2 communicate to define the refrigerant outlet manifold; the holes a3, s3 and c3 communicate to define the anode outlet manifold; the holes a4, s4 and c4 communicate to define the anode inlet manifold; the holes a5, s5 and c5 communicate to define the refrigerant inlet manifold; and the holes a6, s6 and c6 communicate to define the cathode outlet manifold.

An anode flow path 34a is formed on one surface of the anode-side separator 33a, which is a surface facing the membrane electrode assembly 20. The anode flow path 34a communicates with the anode inlet manifold and the anode outlet manifold to flow the fuel gas therethrough. Similarly, a cathode flow path 34c is formed on one surface of the cathode-side separator 33c, which is a surface facing the membrane electrode assembly 20. The cathode flow path 34c communicates with the cathode inlet manifold and the cathode outlet manifold to flow the oxidant gas therethrough. A refrigerant flow path 35a is formed on the other surface of the anode-side separator 33a, which is a surface opposite to the anode flow path 34a. The refrigerant flow path 35a communicates with the refrigerant inlet manifold and the refrigerant outlet manifold to flow the refrigerant therethrough. Also, a refrigerant flow path 35c is formed on the other surface of the cathode-side separator 33c, which is a surface opposite to the cathode flow path 34c. The refrigerant flow path 35c communicates with the refrigerant inlet manifold and the refrigerant outlet manifold to flow the refrigerant therethrough.

Figure 2:
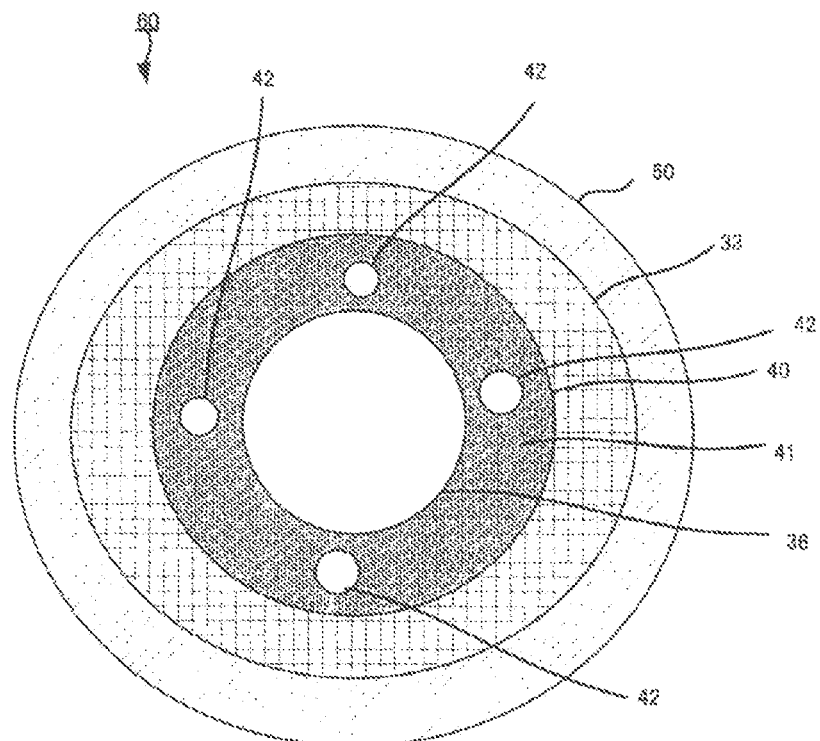
FIG. 2 is a partial cross-sectional view in planar direction of an example of the vicinity of the reaction gas discharge hole of the unit cells in the fuel cell of the disclosed embodiments.

FIG. 2 is a partial cross-sectional view in planar direction of an example of the vicinity of the reaction gas discharge hole of the unit cells in the fuel cell of the disclosed embodiments.

As shown in FIG. 2, the resin sheet 40, a separator 33 and a gasket 50 are formed in this order around a reaction gas discharge hole 36 of the unit cell 60 of the fuel cell. The resin sheet 40 has a protrusion 41 protruding in the planar direction and occupying a part of the second region occupied by the reaction gas discharge hole (reaction gas outlet manifold) 36. Water discharge holes 42 are disposed in the protrusion 41. The MEA will not be described here for simplicity. The gasket 50 shown in FIG. 2 is an example of the gasket which does not have both an extension and a water discharge hole.

Figure 3:
FIG. 3 is a partial cross-sectional view in stacking direction of an example of the vicinity of the reaction gas outlet manifold of the fuel cell stack of the disclosed embodiments.
Figure 3:
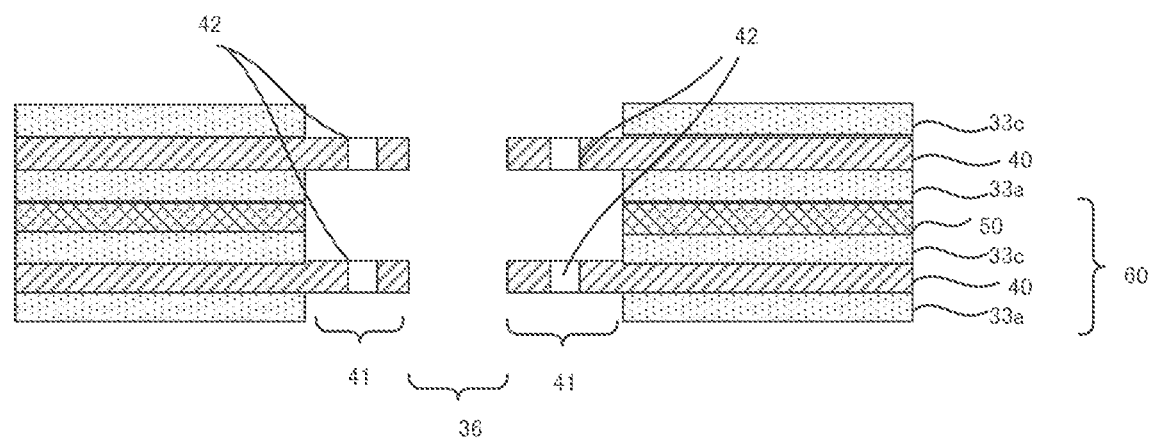

FIG. 3 is a partial cross-sectional view in stacking direction of an example of the vicinity of the reaction gas outlet manifold of the fuel cell stack of the disclosed embodiments.

FIG. 3 is an example of the fuel cell stack including the unit cell shown in FIG. 2.

As shown in FIG. 3, the fuel cell stack 70 in the vicinity of the reaction gas outlet manifold 36 has the unit cells 60. Each unit cell 60 is a stack of the anode-side separator 33a, the resin sheet 40, the cathode-side separator 33c and the gasket 50, which are stacked in this order around the reaction gas outlet manifold 36 of fuel cell stack 70. The resin sheet 40 has the protrusion 41 protruding in the planar direction and occupying a part of the second region occupied by the reaction gas outlet manifold 36. The water discharge holes 42 are disposed in the protrusion 41. The MEA will not be described here for simplicity. The gasket 50 shown in FIG. 3 is an example of the gasket which does not have both an extension and a water discharge hole.

Figure 4:
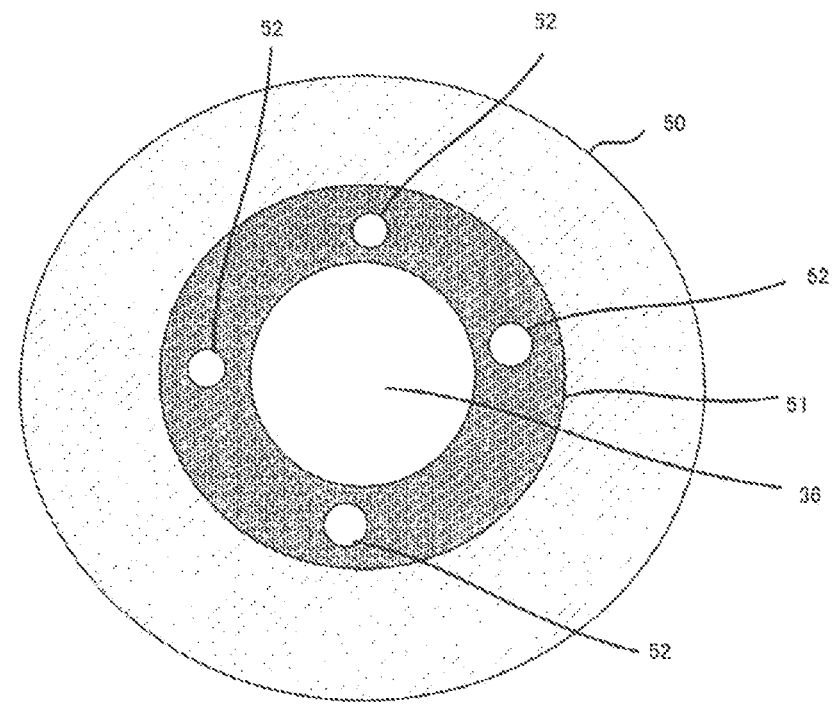
FIG. 4 is a cross-sectional view in planar direction of an example of the vicinity of the reaction gas discharge hole of the gasket used in the disclosed embodiments.

FIG. 4 is a cross-sectional view in planar direction of an example of the vicinity of the reaction gas discharge hole of the gasket used in the disclosed embodiments.

As shown in FIG. 4, the gasket (fixed size part) 50 has an extension 51 protruding in the planar direction and occupying a part of the second region occupied by the reaction gas discharge hole (reaction gas outlet manifold) 36. The water discharge holes 52 are disposed in the extension 51. Accordingly, FIG. 4 shows an example of the gasket which has the extension and the water discharge holes.

Figure 5:
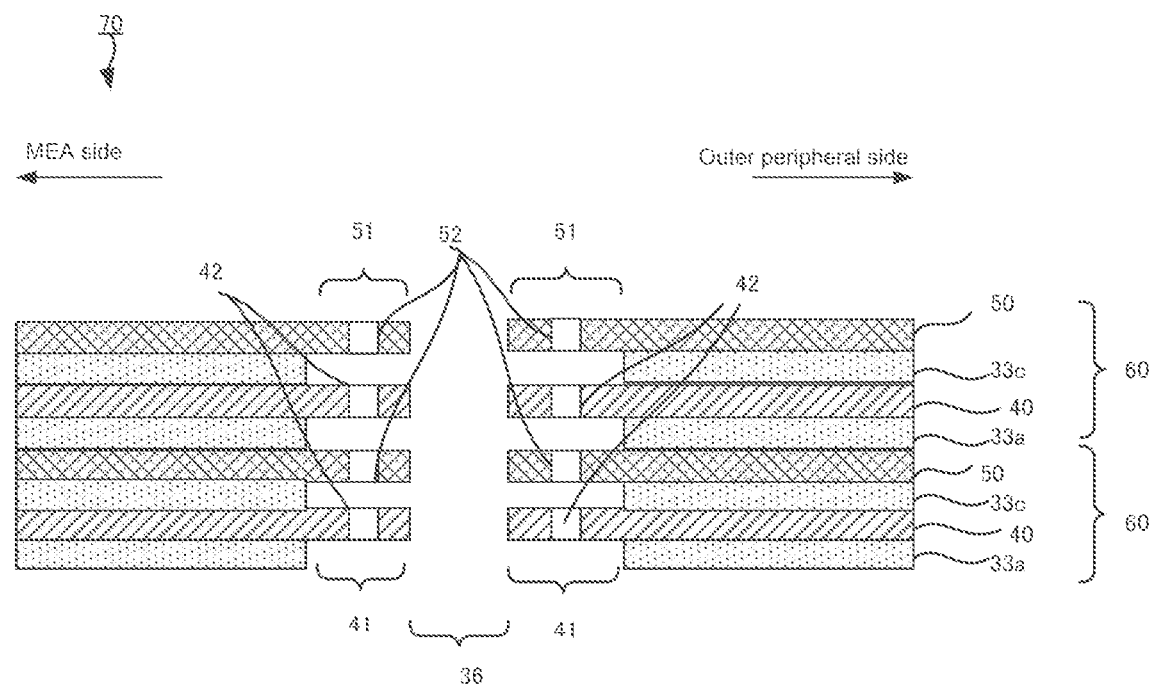
FIG. 5 is a partial cross-sectional view in stacking direction of another example of the vicinity of the reaction gas outlet manifold of the fuel cell stack of the disclosed embodiments.

FIG. 5 is a partial cross-sectional view in stacking direction of another example of the vicinity of the reaction gas outlet manifold of the fuel cell stack of the disclosed embodiments.

FIG. 5 is an example of the fuel cell stack which has a gasket having an extension and water discharge holes.

As shown in FIG. 5, the fuel cell stack 70 in the vicinity of the reaction gas outlet manifold 36 has the unit cells. Each unit cell is a stack of the anode-side separator 33a, the resin sheet 40, the cathode-side separator 33c and the gasket 50, which are stacked in this order around the reaction gas outlet manifold 36 of fuel cell stack 70. The resin sheet 40 has the protrusion 41 protruding in the planar direction and occupying a part of the second region occupied by the reaction gas outlet manifold 36. The water discharge holes 42 are disposed in the protrusion 41. The gasket (fixed size part) 50 has the extension 51 protruding in the planar direction and disposed to align with the protrusion 41. The water discharge holes 52 are disposed in the extension 51, which are disposed to align with the water discharge holes 42 of the protrusion 41. The MEA will not be described here for simplicity.

REFERENCE SIGNS LIST

20. Membrane electrode assembly
22a. Anode-side gas diffusion layer
22c. Cathode-side gas diffusion layer
33. Separator
33a. Anode-side separator
33c. Cathode-side separator
34a. Anode flow path
34c. Cathode flow path
35a, 35c. Refrigerant flow path
36. Reaction gas discharge hole (Reaction gas outlet manifold)
40. Resin sheet
41. Protrusion
42. Water discharge hole
50. Gasket (Fixed size part)
51. Extension
52. Water discharge hole
60. Unit cell
70. Fuel cell stack
a1 to a3, a4 to a6. Hole of anode-side separator 33a
c1 to c3, c4 to c6. Hole of cathode-side separator 33c
s1 to s3, s4 to s6. Hole of resin sheet 40

The invention claimed is:

1. A fuel cell stack comprising stacked unit cells, each comprising a membrane electrode assembly comprising an electrolyte membrane and a pair of electrodes disposed on both surfaces thereof, two separators sandwiching the membrane electrode assembly, and a frame-shaped resin sheet disposed between the two separators and around the membrane electrode assembly to attach the separators, wherein the separators comprise a reaction gas flow path for flowing reaction gas in a planar direction of the separators, a reaction gas supply hole for distributing the reaction gas in a stacking direction of the unit cells, and a reaction gas discharge hole for distributing the reaction gas in the stacking direction of the unit cells;

wherein the resin sheet comprises a reaction gas supply hole and a reaction gas discharge hole, which are aligned and disposed to communicate with the reaction gas supply hole and reaction gas discharge hole of the separators, respectively;

wherein the fuel cell stack comprises a reaction gas inlet manifold communicating between the reaction gas supply holes and a reaction gas outlet manifold communicating between the reaction gas discharge holes;

wherein the fuel cell stack comprises a gasket between the separators of the adjacent unit cells, at a periphery of the reaction gas inlet manifold, and at a periphery of the reaction gas outlet manifold;

wherein the resin sheet comprises a first protrusion protruding in a planar direction of the resin sheet and occupying a part of a first region occupied by the reaction gas inlet manifold, and a second protrusion protruding in the planar direction of the resin sheet and occupying a part of a second region occupied by the reaction gas outlet manifold; and wherein the resin sheet comprises at least one water discharge hole at a predetermined position of at least one protrusion selected from the group consisting of the first protrusion and the second protrusion.

2. The fuel cell stack according to claim 1, wherein the gasket comprises a fixed size part for stacking the unit cells in parallel, and wherein the gasket comprises an extension extending the fixed size part to align with the protrusions of the resin sheet.

* * * * *